(12) United States Patent
Sato

(10) Patent No.: US 10,165,057 B2
(45) Date of Patent: Dec. 25, 2018

(54) INFORMATION PROCESSING TERMINAL, AND CONTROLLING METHOD THEREOF

(71) Applicant: CANON KABUSHIKI KAISHA, Tokyo (JP)

(72) Inventor: Tetsuya Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/106,973

(22) PCT Filed: Jan. 19, 2015

(86) PCT No.: PCT/JP2015/051938
§ 371 (c)(1),
(2) Date: Jun. 21, 2016

(87) PCT Pub. No.: WO2015/111737
PCT Pub. Date: Jul. 30, 2015

(65) Prior Publication Data
US 2016/0344822 A1    Nov. 24, 2016

(30) Foreign Application Priority Data
Jan. 22, 2014   (JP) ................................ 2014-009386

(51) Int. Cl.
*G06F 9/54*   (2006.01)
*H04L 29/06*  (2006.01)
*H04L 29/08*  (2006.01)

(52) U.S. Cl.
CPC .............. *H04L 67/16* (2013.01); *G06F 9/547* (2013.01); *H04L 67/02* (2013.01); *H04L 67/10* (2013.01); *H04L 67/42* (2013.01)

(58) Field of Classification Search
CPC ......... G06F 9/547; H04L 67/02; H04L 67/42; H04L 67/16; H04L 67/10
See application file for complete search history.

(56) References Cited

U.S. PATENT DOCUMENTS

2011/0055323 A1* 3/2011 Kawai ............... H04N 1/00244
709/203
2011/0093580 A1* 4/2011 Nagasaka ................ G06F 8/60
709/223

(Continued)

FOREIGN PATENT DOCUMENTS

JP    2013-96969 A    5/2013
JP    2013-196356 A   9/2013

OTHER PUBLICATIONS http://web.archive.org/web/20120805124211/www.chromium.org/developers/web-intents-in-chrome.*

(Continued)

*Primary Examiner* — Cheikh T Ndiaye
(74) *Attorney, Agent, or Firm* — Venable LLP

(57) ABSTRACT

A proxy application starts a Web browser (UA) in response to a Local Intent process request. The proxy application converts the Local Intent process request into a Web Intent process request, and sends the converted request to the Web browser. The Web browser provides, to a user, a list of Web Intents registered in the UA corresponding to the Web Intent process request, in order to select a providing function of a Web application using data designated in the Local Intent process request.

8 Claims, 14 Drawing Sheets

(56) References Cited

U.S. PATENT DOCUMENTS

| | | | | |
|---|---|---|---|---|
| 2012/0173657 A1* | 7/2012 | Ozzie | ............... | G06F 9/44526 |
| | | | | 709/217 |
| 2014/0025725 A1* | 1/2014 | Park | ............... | G06F 3/1423 |
| | | | | 709/203 |
| 2014/0122610 A1* | 5/2014 | Jing | ............... | H04L 67/10 |
| | | | | 709/204 |
| 2014/0229839 A1* | 8/2014 | Lynch | ............... | G06F 9/44505 |
| | | | | 715/736 |
| 2015/0186377 A1* | 7/2015 | James | ............... | G06F 17/3053 |
| | | | | 707/726 |

OTHER PUBLICATIONS

Office Action dated Mar. 27, 2018 in counterpart Japan Application No. 2014-009386, together with English translation thereof.

* cited by examiner

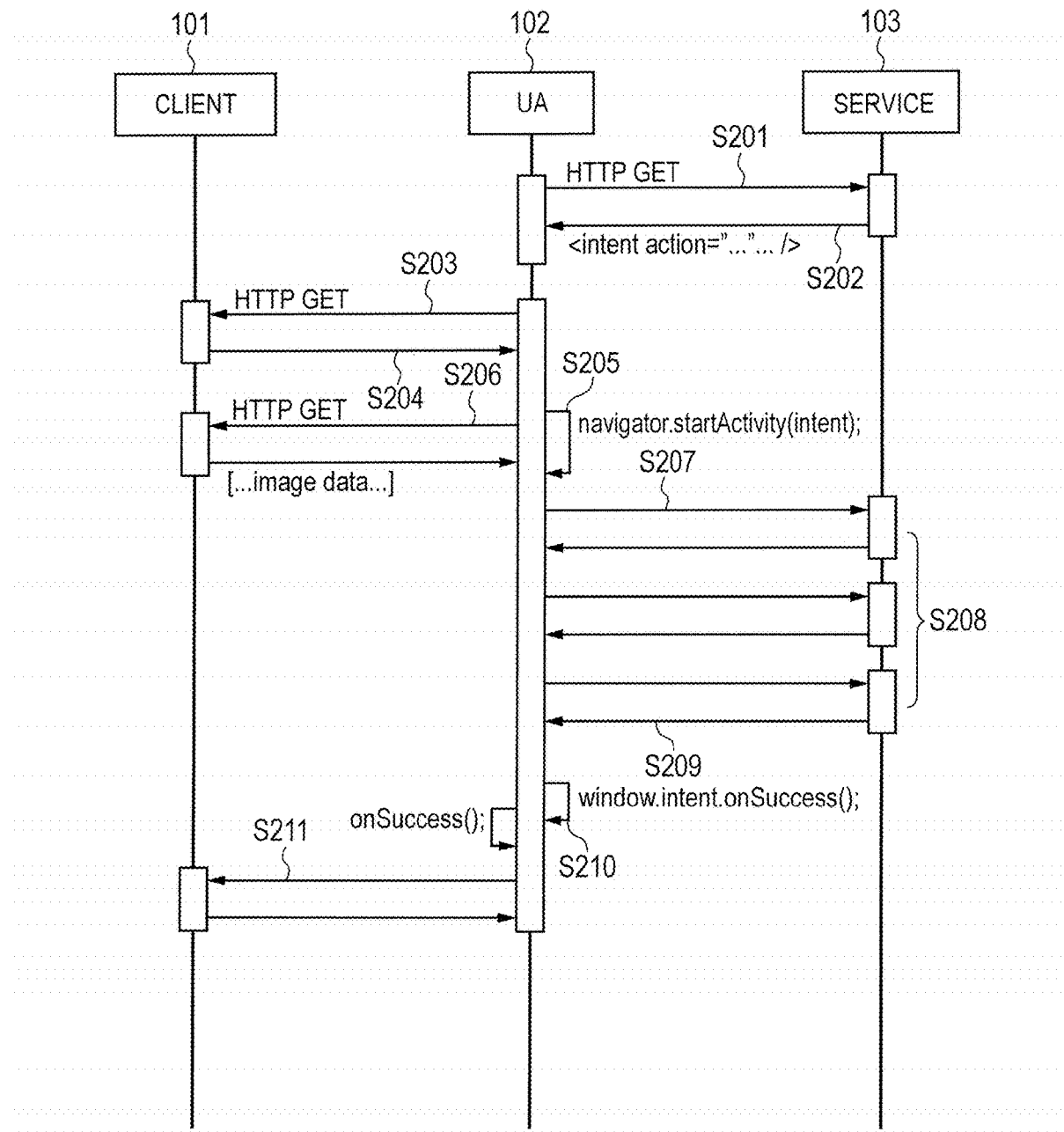

FIG. 3

```
<intent
  action="http://webintents.org/share"
  type="image/*"
  href="share.html"
  title="Image share service"
  disposition="window"
/>
```

FIG. 4

```
document.getElementById('share-photo').addEventListener(
  "click", function() {
    var intent = new Intent(
      {"action":"http://webintents.org/share",
       "type":"image/*",
       "data":getImageFrom(...)});
    navigator.startActivity(intent, onSuccess);
}, false);
```

```
<manifest ···>
...
<application ···>
 <activity name=".SendActivity" ···>
  <intent-filter>
    <action name="intent.action.SEND" />
    <category name="intent.category.DEFAULT" />
    <data mimeType="image/*" />
  </intent-filter>
 </activity>
 ...
</application>
...
</manifest>
```

```
public void onClick(View view) {
        try {
            Intent intent = new Intent();
            intent.setAction(Intent.ACTION_SEND);
            intent.setType("image/*");
            intent.putExtra(Intent.EXTRA_STREAM, uri);
            startActivityForResult(intent);
        } catch (Exception e) {
            ...
        }
} protected void onActivityResult(int requestCode, int resultCode, Intent data) {
    ...
}
```

| Action ID | Local Intents action | Web Intents action |
|---|---|---|
| 1 | ACTION_SEND | http://webintents.org/share |
| 2 | ACTION_EDIT | http://webintents.org/edit |
| 3 | ACTION_PICK | http://webintents.org/pick |
| 4 | ACTION_GET_CONTENT | http://webintents.org/pick |
| 5 | ACTION_VIEW | http://webintents.org/view |
| 6 | ACTION_DEFAULT | http://webintents.org/view |

| Service ID | action | type | href | title | disposition | base URI |
|---|---|---|---|---|---|---|
| 1 | share | image/jpeg | aaa_share.html | Image share service | window | http://aaa.com |
| 2 | edit | image/* | bbb_edit.html | Edit service | inline | http://bbb.com |
| 3 | share | image/jpeg | bbb_share.html | Print Service | window | http://bbb.com |

| ImageID | File |
|---|---|
| 1 | image125.jpg |
| 2 | image435.jpg |

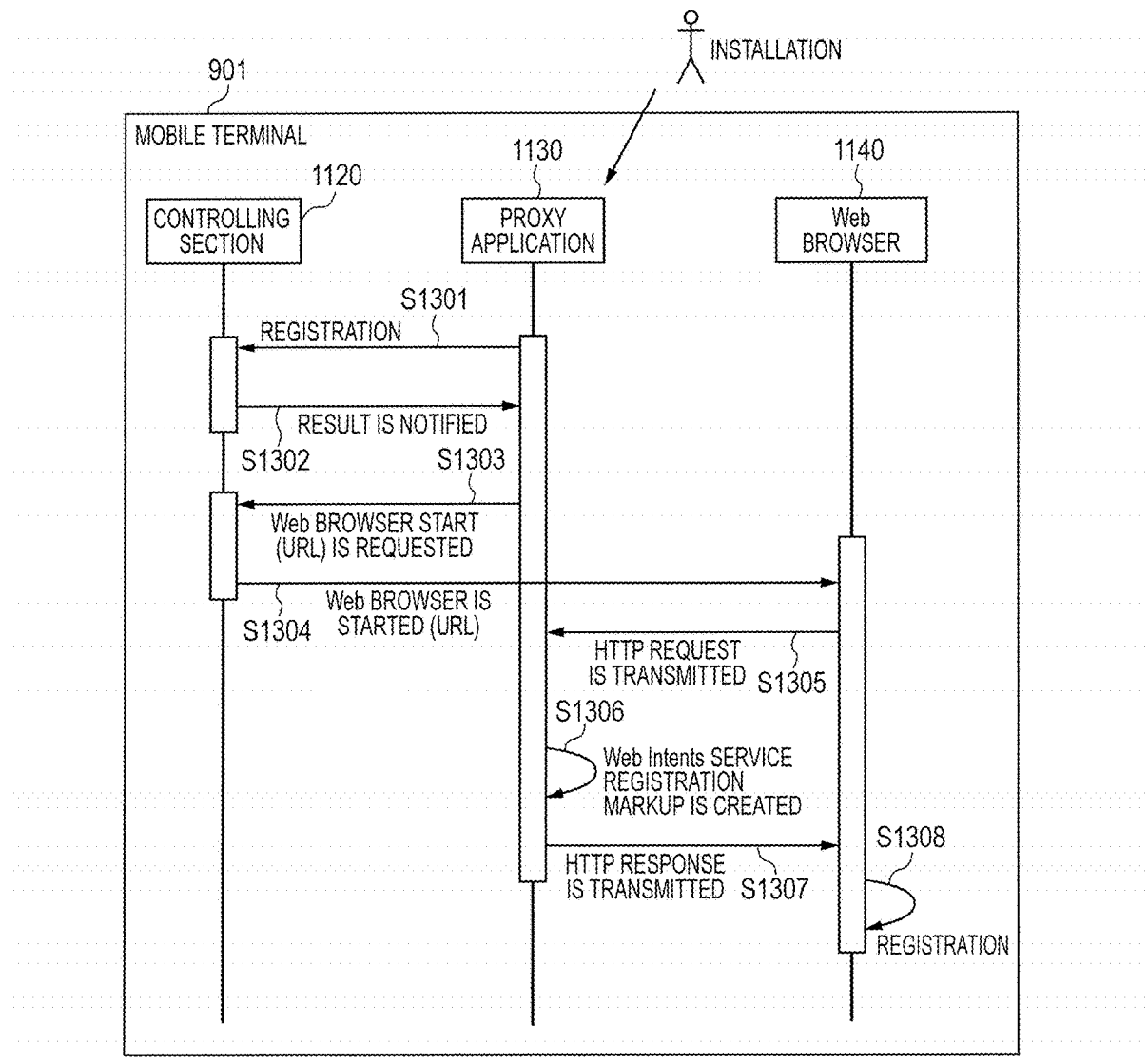

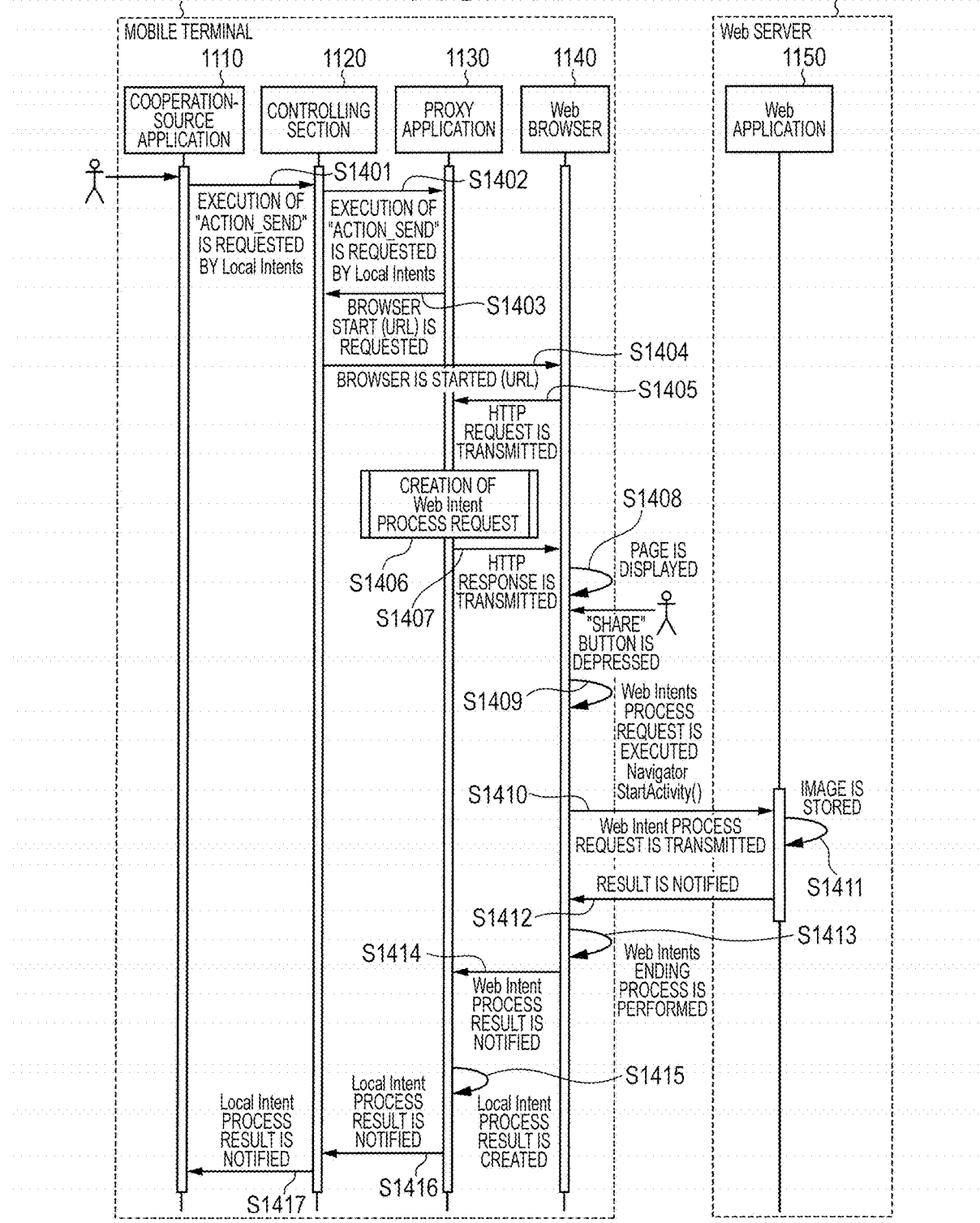

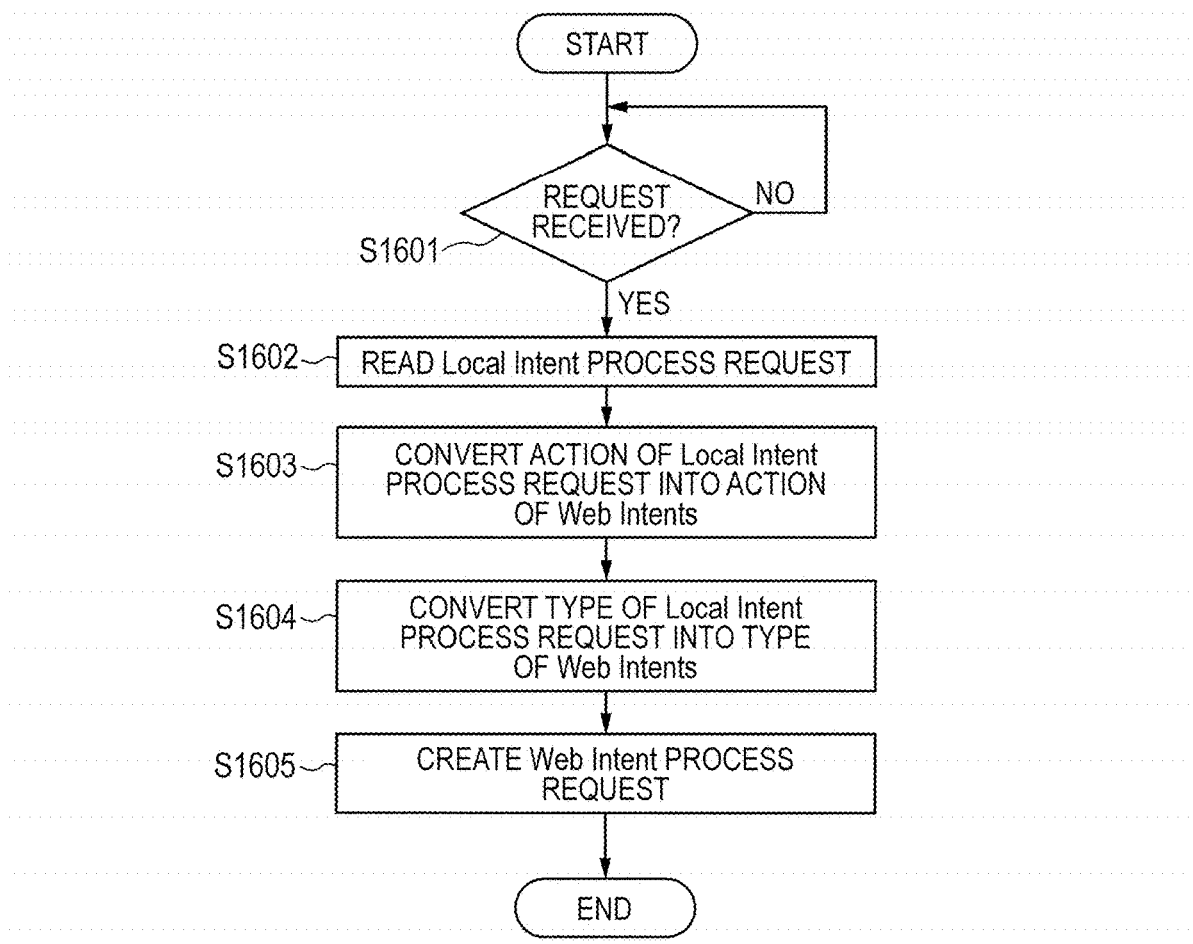

INFORMATION PROCESSING TERMINAL, AND CONTROLLING METHOD THEREOF

TECHNICAL FIELD

The present invention relates to a technique in a case where a service on a network and an application in an information processing terminal cooperate with each other.

BACKGROUND ART

In recent years, along with the popularization of an information processing terminal so called a smartphone, a mechanism of establishing cooperation among a plurality of applications and thus providing advanced services to users has been achieved.

For example, PTL 1 discloses a technique which enables, by controlling a first application to give an image identifier to a second application, the second application to display an image having resolution higher than that of an image displayed by the first application.

Moreover, on the Internet, a mechanism, such as Web Intents, of achieving cooperation of Web applications in a Web site having a Web server function is proposed.

However, in the technique of PTL 1, although two applications in an information processing terminal can cooperate with each other, any cooperation with a Web application on the Internet is not considered.

Moreover, the new cooperation mechanism such as the Web Intents or the like enables the cooperation of the Web applications, but cannot achieve cooperation with a general application in an information processing terminal having no Web server function.

CITATION LIST

Patent Literature

PTL 1: Japanese Patent Application Laid-Open No. 2013-96969

SUMMARY OF INVENTION

The present invention has been completed in order to solve such problems as described above, and an object of the present invention is to provide a mechanism which can easily establish cooperation between an application executed in an information processing terminal and a Web application.

Solution to Problem

Therefore, the present invention is characterized by an information processing terminal which has a relay function by which a client which manages data and a service which provides a function by using the data managed by the client cooperate with each other through a network, comprising: a registering unit configured to perform a registering process by the relay function, based on function information for calling a function provided by a first service on the network; a starting unit configured to start the relay function in response to a call of a function provided by a second service in the information processing terminal; and a providing unit configured to provide, to a user, function information according to the registering process by the started relay function to select the function provided by the first service using data designated when the function provided by the second service was called.

Further features of the present invention will become apparent from the following description of exemplary embodiments with reference to the attached drawings.

BRIEF DESCRIPTION OF DRAWINGS

FIG. 2 is a sequence diagram exemplarily illustrating an outline of a basic operation of the Web Intents.

FIG. 3 is a diagram illustrating an example of a registration markup of the Web Intents.

FIG. 4 is a diagram illustrating an example a basic Web Intent process request of the Web Intents.

FIG. 7 is a diagram illustrating an example of a registration markup of the Local Intents.

FIG. 8 is a diagram illustrating an example a basic Local Intent process request of the Local Intents.

FIGS. 12A, 12B and 12C are diagrams illustrating examples of table configurations for managing data in the embodiment.

FIG. 13 is a sequence diagram exemplarily illustrating an installation operation of a proxy application.

FIG. 14 is a sequence diagram exemplarily illustrating a cooperating operation of a cooperation-source application and a Web application.

FIG. 16 is a flow chart for exemplarily describing an Intent converting process of the proxy application.

FIG. 17 is a diagram illustrating another example the Web Intent process request to be created by the proxy application.

DESCRIPTION OF EMBODIMENTS

Hereinafter, embodiments of the present invention will be described with reference to the attached drawings.
First Embodiment
<Basic Mechanism of Web Intents>

Initially, the basic mechanism of the Web Intents which is an example of a mechanism for cooperating with an arbitrary Web service (or a Web application) without using a dedicated API (application programming interface) will be described with reference to FIGS. 1 to 4. Although the present invention exemplifies the Web Intents, it is also possible to apply another similar mechanism as the technique of cooperating with the arbitrary Web service (or the Web application).

Figure 1:
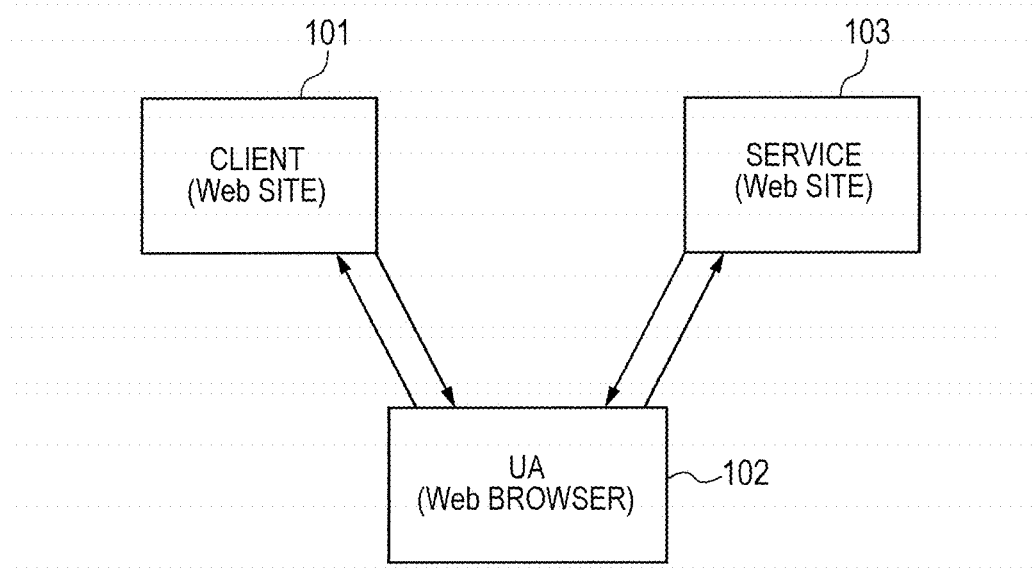
FIG. 1 is a diagram exemplarily illustrating a basic system configuration of Web Intents.

FIG. 1 is the diagram exemplarily illustrating the entire configuration of the Web Intents.

More specifically, FIG. 1 illustrates a Web Intents service (hereinafter, a service) 103 which provides a service or a function by using Web Intents techniques, a Web Intents client (hereinafter, a client) 101 which uses the service 103, and a UA (user agent) 102 which serves to pass a request from the client 101 to the service 103 and pass a result from the service 103 to the client. It can be said that the UA 102 is equivalent to a relay function for executing a request and exchanging data between the client 101 and the service 103. Besides, a Web Intent which is function information for calling a providing function of the service 103 is registered in the UA 102.

In the relevant mechanism, for example, the client 101 is a Web site which manages data and provides buttons and the like for calling services, the UA 102 is a Web browser which displays the Web site, and the service 103 is a Web site of a cooperation destination which accepts and processes the data managed by the client 101 through the UA 102.

For example, in a case where the relevant mechanism is applied to an SNS (social networking service), the service 103 serves as a post-destination service which accepts posts of photographs and comments to be managed by the client and constitutes a browsing site. In case of likening social buttons such as "like", "check", "share" and the like of an SNS site to the Web Intents mechanism, the client 101 corresponds to the side which provides the buttons, the UA 102 corresponds to the Web browser, and the service 103 corresponds to the post-destination service of "like" or the like. Incidentally, when the service 103 provides the function, if a user authentication, a user operation and the like are necessary, an user performs necessary operations on the UA 102.

In any case, it is possible to realize the UA 102 by, in addition to the Web browser, an OS (operating system), an application or the like which operates in an information processing terminal if it has a function for cooperating with the service. For example, a personal computer, a smartphone, a tablet computer, a car navigation system and the like are used as the information processing terminal.

As for the service 103, in addition to the service provider on the Internet such as the above post-destination service, for example, devices such as a camera, a printer, a scanner and the like of the information processing terminal can be used as the service provider. Moreover, as for the service 103, peripherals such as a printer, a scanner, a network camera and the like, and home electric appliances such as a refrigerator, a television set and the like, which are connected through a network, can be used as the service provider. There is a case where an arbitrary combination of the client 101, the UA 102 and the service 103 operates in the same system. Moreover, the client 101, the UA 102 and the service 103 may be the functions which operate on the same apparatus.

FIG. 2 is the sequence diagram for describing the basic operation for providing services using the Web Intents.

In S201, the UA 102 accesses the service 103 in response to the operation of a user. In S202, the service 103 returns, to the UA 102, an HTML (HyperText Markup Language) response including a registration markup for causing the UA 102 to register the function provided by the service itself.

FIG. 3 is the diagram illustrating an example of an HTML document to be returned from the service 103 to the UA 102 in S202. Hereinafter, the content of the HTML document returned from the service 103 to the UA 102 will be described with reference to FIG. 3.

Function information for specifying a providing function and calling the function provided by the service 103 is described in an <intent> tag. An action indicates classification information (i.e., a category) of the providing function. That is, the action indicates the classification information indicating what kind of function and service the providing function provides. For example, the classification information of the providing function includes classification information "Share" corresponding to a function to share data, classification information "Edit" corresponding to a function to edit data, classification information "View" corresponding to a function to browse or view data, classification information "Pick" corresponding to a function to obtain or pick up data, classification information "Save" corresponding to a function to store or save data, and the like. That is, any of "Share", "Edit", "View", "Pick" and "Save" is described as the classification information in the function information. Incidentally, it should be noted that "View" is equivalent to "browse", "Pick" is equivalent to "obtain", and "Save" is equivalent to "store".

A type indicates a type or kind of data or the like which can be handled by the providing function. That is, the type indicates a data type which can be handled for the action. An href indicates the connection destination (i.e., the URL (Uniform Resource Locator)) of the providing function, a title indicates a title of the providing function, and a disposition indicates how the called providing function is displayed.

In the example of FIG. 3, the category of the providing function is "share", the kind of data which can be handled is "image data of every format (*)", the connection destination is "share.html", and the title is "image share service". Further, it is indicated that this function is displayed on another window through the UA 102.

If the HTML response in S202 is received, the UA 102 confirms for the user whether to register the providing function of the service 103 to the UA 102. For example, when the UA 102 is the Web browser, a popup window is displayed to urge the user to select whether or not to authorize the registration. If the user selects to register the providing function as the Web Intent, the UA 102 performs a registering process of internally storing the information received in S202. More specifically, the information received in S202 is stored in the storage area of the information processing terminal in which the UA 102 operates, and the stored information is registered in the UA 102 as the Web Intents.

In S203, the UA 102 accesses the client 101 in response to the operation of the user. In S204, the client 101 returns, to the UA 102, an HTML document in which use or utilization of the providing function (i.e., the Web Intent) of the service 103 has been described. For example, if an image and a "share" button are displayed on the Web site serving as the client 101, the Web site returns the HTML document which includes an ECMAScript as in FIG. 4 corresponding to a process request of the Web Intent (i.e., a Web Intent process request) to the UA 102.

FIG. 4 is the diagram illustrating an example the HTML document which is returned from the client 101 to the UA 102 in S204. Hereinafter, the content of the HTML document returned from the client 101 to the UA 102 will be described with reference to FIG. 4.

The ECMAScript indicates that, if a button having the ID 'share-photo' in the HTML is clicked, a designated unnamed function is executed. More specifically, the unnamed function initially creates a new Intent object, and calls a startActivitiy( ) function using the created object as an argument. If this function is executed, the UA 102 extracts, from the Web Intents registered in the UA itself, the Web Intents of which the type coincides with that of the action of the designated Web Intent object, and list-displays the extracted Web Intents so as to request the user to perform selection. Further, the UA 102 obtains the image data in the client 101 by executing a getImageFrom( ) function called in the unnamed function.

In S204, the UA 102 receives the HTML document sent from the client 101, and displays the screen based on the received HTML document. In S205, if it is detected that the "share" button on the screen is depressed by the user, the UA 102 executes the ECMAScript for starting the Web Intents as described above. Then, in S206, the UA obtains the image data of the client 101. Moreover, when it is detected in S205 that the "share" button is depressed, the UA 102 displays the list of the Web Intents registered in the UA itself. If it is detected that the Web Intent indicating the providing function of the service 103 is selected by the user from the displayed list, in S207, the UA 102 sends an HTTP (Hyper-Text Transfer Protocol) request (i.e., a Web Intent process request) to the service 103 which provides the selected providing function. At this time, the UA 102 includes, in the transmission data, the content of the Web Intent object which is created by the ECMAScript of FIG. 4.

If the HTTP request sent from UA 102 in S207 is received, in S208, the service 103 draws the Web Intent object from the HTTP request, and realizes the use of the selected providing function (here, "share" of the image data of the client 101) while interfacing with the user through the UA 102.

If the process related to the providing function is ended, in S209, the service 103 returns, to the UA 102, a response which includes the ECMAScript notifying the client 101 of the process result. If the response is received in S209, in S210, the UA 102 executes the ECMAScript included in the response, and calls a callback function onSuccess( ) which is designated by the argument of the startActivitiy( ) function of S205. In S211, the UA 102 returns the process result to the client 101 by the callback function onSuccess( ).

Here, an example that a Web mail function is used will be described with reference to the sequence diagram of FIG. 2. Initially, the user visits through the Web browser (i.e., the UA 102) the site on which a Web Intents calling button of the Web storage (i.e., the client 101) which manages photograph data, and the user depresses the button. Then, the Web browser (i.e., the UA 102) displays the popup window which includes the registered service list. If the user selects the Web mail function as the service on the displayed popup window, the site which provides the Web mail function is displayed on another window, and, as the process result, a new mail to which the photograph data is attached is created on the displayed window. Incidentally, the above operation that the Web Intent object is drawn from the Web Intent process request and the drawn object is analyzed and processed will be considered as the operation that the Web Intent is processed, hereinafter.

By the above process, the client 101 can call, through the UA 102, the function of the Web Intents (i.e., "share" of the image in this example) which is provided by the service 103.

<Basic Mechanism Related to Cooperation of Applications in Mobile Terminal>

Subsequently, the basic mechanism which is related to cooperation of applications operating in a mobile terminal being an example of the information processing terminal will be described with reference to FIGS. 5 to 8. In the present embodiment, an example that, an Android™ OS operates as the OS in the mobile terminal will be described.

In the Android™ OS, cooperation that data are exchanged in a plurality of applications is performed in Intents. Here, the Intents in the Android™ OS is equivalent to registration information to be used to call a service in the cooperation of the applications and a mechanism using the relevant registration information. Hereinafter, to distinguish from the Web Intents, the Intents which is the example of the registration information for calling the service in the plurality of applications will be described as Local Intents.

Figure 5:
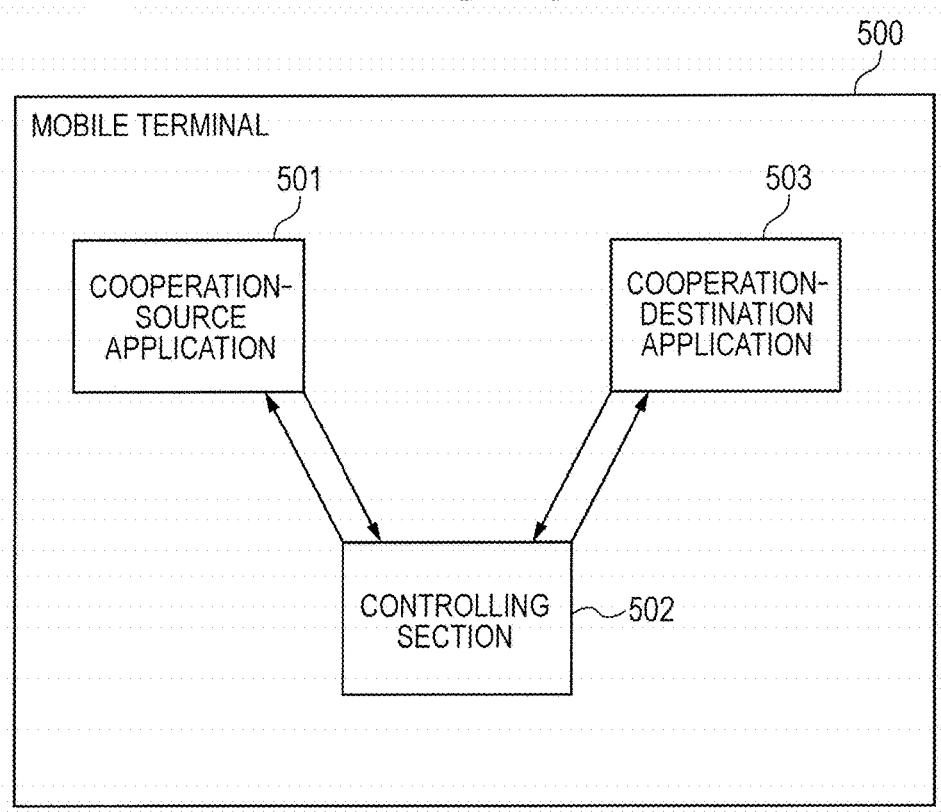
FIG. 5 is a diagram exemplarily illustrating a basic system configuration of Local Intents.

FIG. 5 is the diagram exemplarily illustrating the entire configuration of the Local Intents.

More specifically, FIG. 5 illustrates a mobile terminal 500 which is an example of the information processing terminal. The mobile terminal 500 includes a cooperation-destination application 503 which provides a function by using the Local Intents technique, a cooperation-source application 501 which uses the function of the cooperation-destination application, and a controlling section 502 which passes a request from the cooperation-source application 501 to the cooperation-destination application 503 and further passes a result from the cooperation-destination application 503 to the cooperation-source application 501. Incidentally, it should be noted that the controlling section 502 can be realized by, for example, the OS or the like.

Figure 6:
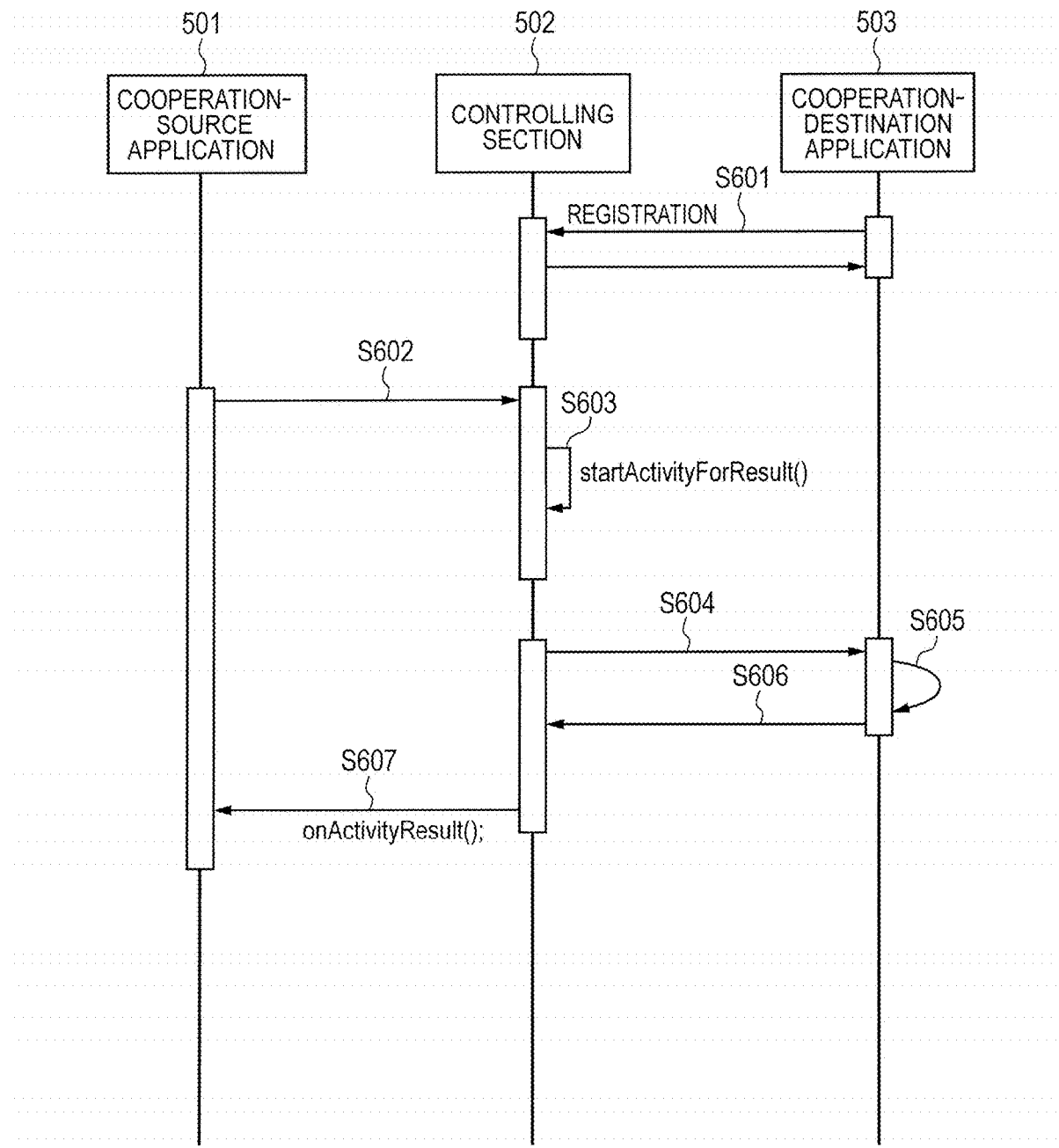
FIG. 6 is a sequence diagram exemplarily illustrating an outline of a basic operation of the Local Intents.

FIG. 6 is the sequence diagram for describing a basic function providing operation in which the Local Intents is used.

In S601, the cooperation-destination application 503 is installed in the mobile terminal 500 in response to a user operation or the like to the mobile terminal 500, and the information of the function provided by the cooperation-destination application 503 is registered in the controlling section 502.

FIG. 7 is the diagram illustrating an example of a part of a manifest file which is used to register, in the controlling section 502, the function provided by the cooperation-destination application 503 when the cooperation-destination application 503 is installed in S601.

An <application> tag is described in a manifest file 700. In the <application> tag, information for specifying the function provided by the cooperation-destination application 503 or the like is described. In an <activity> tag, information related to one function provided by the cooperation-destination application 503 is described. When the cooperation-destination application 503 provides a plurality of functions, the <activity> tags as many as the number of the provided functions are described.

In an <intent-filer> tag, information for notifying the controlling section 502 what kind of request of the Local Intents the relevant function can accept and what kind of data the relevant function can handle is described. More specifically, <action>, <category> and <data> tags are described in the <intent-filer> tag.

The action indicates what kind of request of the Local Intent (Local Intent request) the relevant function can accept, and the category indicates additional information of a type of the relevant function. The data indicates a type of data which can be handled by the relevant function. That is, the data indicates a date type or the like which can be handled for the action. In this example, the function that the name of the activity is "SendActivity" accepts the Local Intent request for transmitting data (intent.action.SEND). Moreover, it is indicated by the description of the <data> tag that the data which can be handled is image data of every format (*).

Hereinafter, the operation illustrated in FIG. 6 will be described again.

In S602, if a user operation such as button depression or the like is accepted, the cooperation-source application 501 sends a later-described process request of the Local Intent (Local Intent process request) to the controlling section 502 as an application cooperation process request. Here, an example of source codes by which the cooperation-source application 501 accepts the button depression operation in S602 will be described with reference to FIG. 8.

FIG. 8 is the diagram exemplarily illustrating a part of the source codes by which the cooperation-source application 501 accepts the button depression operation in S602.

A source code 800 includes two functions, i.e., an onClick( ) function which is executed when the button depression is accepted, and an onActivityResult( ) function which is executed when a result to the Local Intent process request is received from the controlling section 502.

If the button displayed on the UI is depressed, the cooperation-source application 501 executes the onClick( ) function. In the onClick( ) function, the Local Intent process request is created. More specifically, in the onClick( ) function, a new Local Intent object is created, and a startActivitiyForResult( ) function is called using the created Local Intent object as an argument. If the called function is executed, the Local Intent process request is sent to the controlling section 502. The controlling section 502 extracts, from the providing functions of the applications registered in the controlling section itself, the applications for providing the providing function of which the type coincides with that of the designated Local Intent action, and list-displays the extracted applications to urge the user to perform selection. In the example of FIG. 8, the applications in which the action is "ACTION_SEND" and which can process the image data of every format (*) are list-displayed. That is, also the cooperation-destination application 503 registered in S601 is list-displayed together.

Again, the operation illustrated in FIG. 6 will be described hereinafter.

In S603, if the startActivitiyForResult( ) function is executed, as described above, the controlling section 502 list-displays the applications which can process the designated Local Intent. If the cooperation-destination application 503 is selected by the user from the displayed list, in S604, the controlling section 502 passes the Local Intent process request to the selected cooperation-destination application 503. At this time, the controlling section 502 includes the content of the Local Intent object in the process request.

In S605, the cooperation-destination application 503 draws the Local Intent object from the Local Intent process request passed in S604, and realizes the providing function (i.e., the function requested by the cooperation-source application 501). For example, the cooperation-destination application 503 draws the image data from the Local Intent object, and stores the drawn image data in the area to be managed by the cooperation-destination application itself. The above operation that the Local Intent object is drawn from the Local Intent process request and the drawn object is analyzed and processed will be considered as the operation that the Local Intent is processed, hereinafter.

In S606, if the Local Intent process is ended, the cooperation-destination application 503 notifies the controlling section 502 of the process result. Then, if such a notification is received, in S607, the controlling section 502 calls a callback function onActivityResult( ) illustrated in FIG. 8. The UA 102 returns the process result to the cooperation-source application 501 by the callback function onActivityResult( ).

By the above processes, the cooperation-source application 501 can call the function provided by the cooperation-destination application 503 through the controlling section 502.

<System Configuration of Present Embodiment>

Figure 9:
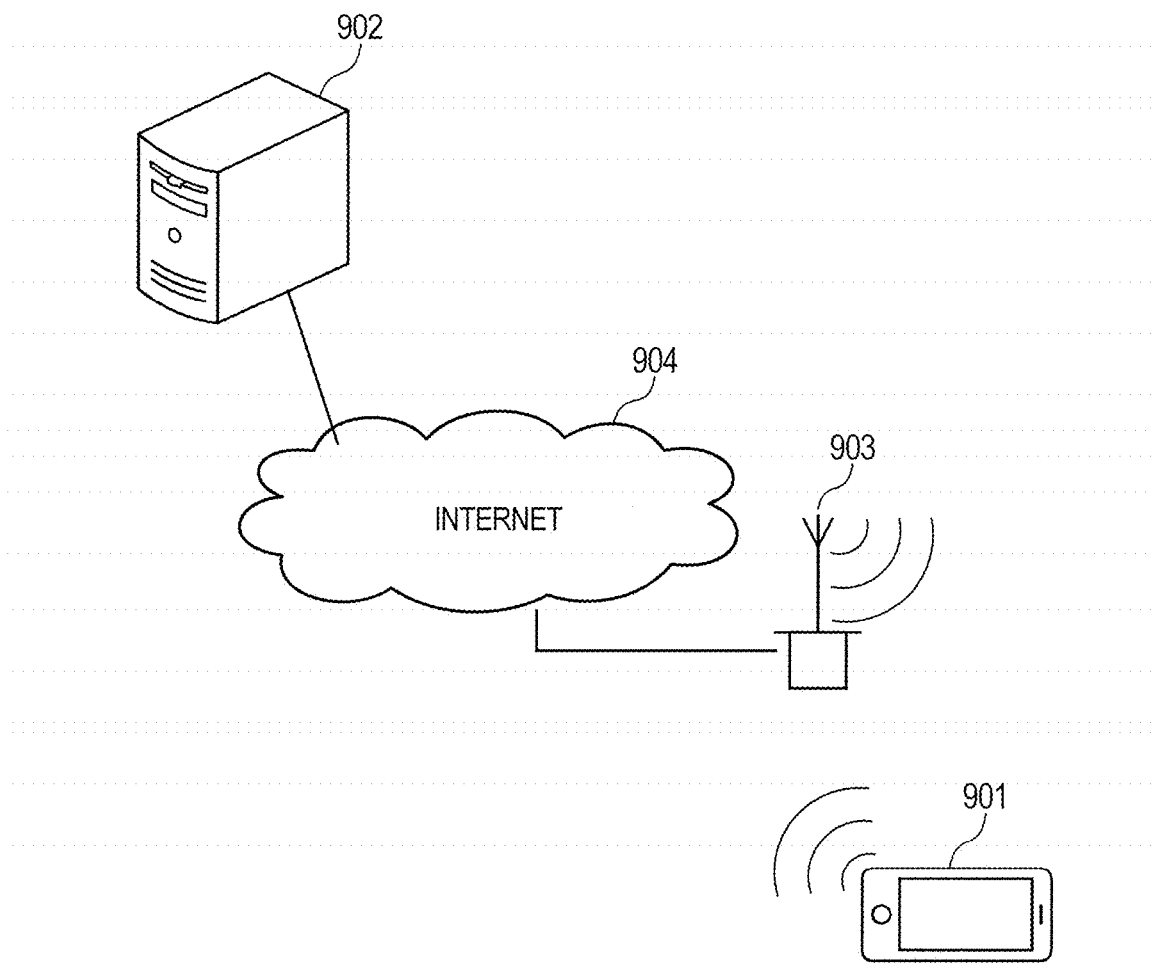
FIG. 9 is a system configuration diagram of an example of the present invention.

FIG. 9 is a diagram illustrating a relation of connections in a network system which includes a mobile terminal, a Web server and the like, according to the embodiment of the present invention.

In FIG. 9, the network system includes a mobile terminal (device) 901 which is an example of the information processing terminal. The Web browser has been installed in the mobile terminal 901. Thus, it is possible for the user to use various services by accessing wireless networks provided by a wireless LAN (local area network) and an outside cellular data communication carrier (hereinafter, a carrier).

The network system further includes a wireless base station 903. The wireless base station 903 is a wireless-communication base station provided by the carrier. The network system further includes the Internet 904, and a Web server 902 providing services on the Internet 904. The mobile terminal 901 can access the Internet 904 through the network provided by the wireless base station 903, and can further access the service provided by the Web server 902. For example, the Web server 902 provides a general photo service (PhotoService) for sharing photographs or the like, and also provides services using the mechanism of the Web Intents. Therefore, the Web server 902 corresponds to the service 103 in FIG. 1. Incidentally, it is assumed that the Internet 904 includes the LAN, the Internet and possible combinations thereof. Here, both wired connection and wireless connection are applicable to the Internet.

<Example of Hardware Constitution of Mobile Terminal 901 in Present Embodiment>

Figure 10A:
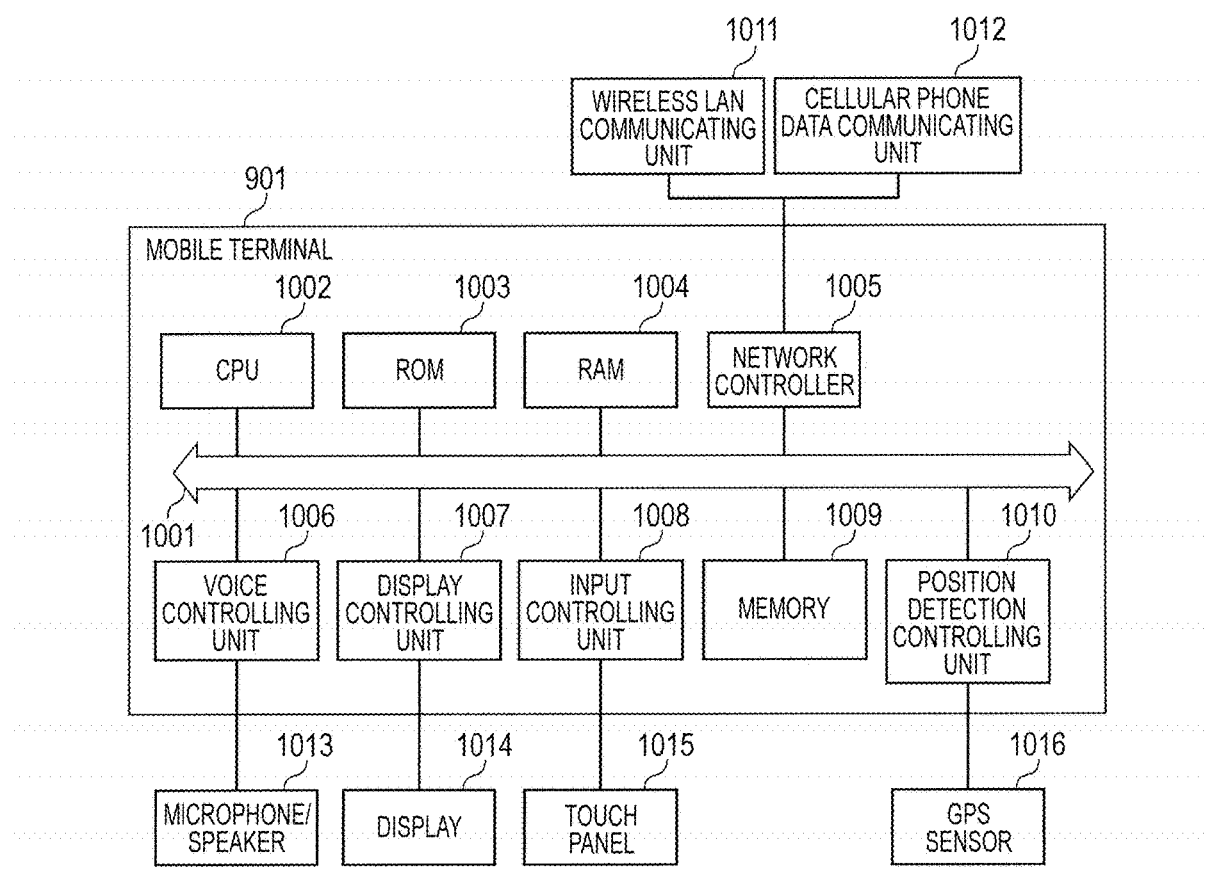
FIGS. 10A and 10B are diagrams exemplarily illustrating respective hardware constitutions of a mobile terminal and a Web server.

FIG. 10A is a block diagram exemplarily illustrating the hardware constitution of the mobile terminal 901 in FIG. 9.

For example, a smartphone, a tablet computer and the like can be used as the mobile terminal 901. In the mobile terminal, an operating system for a compact terminal, and programs for controlling telephone call and data communication are running. Each hardware constitutional element in the mobile terminal 901 is connected to a system bus 1001. Programs such as the operating system in the mobile terminal 901, applications for controlling the telephone call and the data communication, and the like have been stored in a ROM (read only memory) 1003, and the stored programs are executed by a CPU (central processing unit) 1002. Incidentally, as the application for controlling the data communication, mail soft (E-mail software), the Web browser, and the like can be used.

A RAM (random-access memory) 1004 is a working memory area for executing the programs. In addition, the RAM 1004 is a memory for temporarily storing Web page data obtained by the Web browser from the Web server, authentication information for accessing the Web service, and the like. A memory 1009 is a non-volatile storage device such as a flash memory or the like, and various operation mode settings, an operation log and the like which have to be held after a restart of the mobile terminal 901 are stored therein.

A network controller 1005 controls communication by a wireless LAN communicating unit 1011 for taking part in a wireless LAN such as a home network or the like, and communication by a cellular phone data communicating unit 1012 for taking part in a network provided by the carrier.

A voice controlling unit 1006 is mainly used when a telephone call application has been started and thus the user is making a call. A microphone/speaker 1013 inputs and outputs voice data, and the voice controlling unit 1006 mediates the control program for the microphone/speaker. A display controlling unit 1007 controls the information to be output on a display 1014 of the mobile terminal 901. An input controlling unit 1008 controls the information which is designated by the user through the buttons and a touch panel 1015 of the mobile terminal 901. On the mobile terminal 901, the application provides network communication information and various kinds of information of the mobile terminal 901 to the user, by using the voice controlling unit 1006, the display controlling unit 1007 and the input controlling unit 1008.

A position detection controlling unit 1010 obtains the position information of the mobile terminal 901 from a GPS (global positioning system) sensor 1016, and provided the obtained position information to the operating system, under the control of the operating system running in the CPU 1002.

<Example of Hardware Constitution of Web Server 902 in Present Embodiment>

Figure 10B:
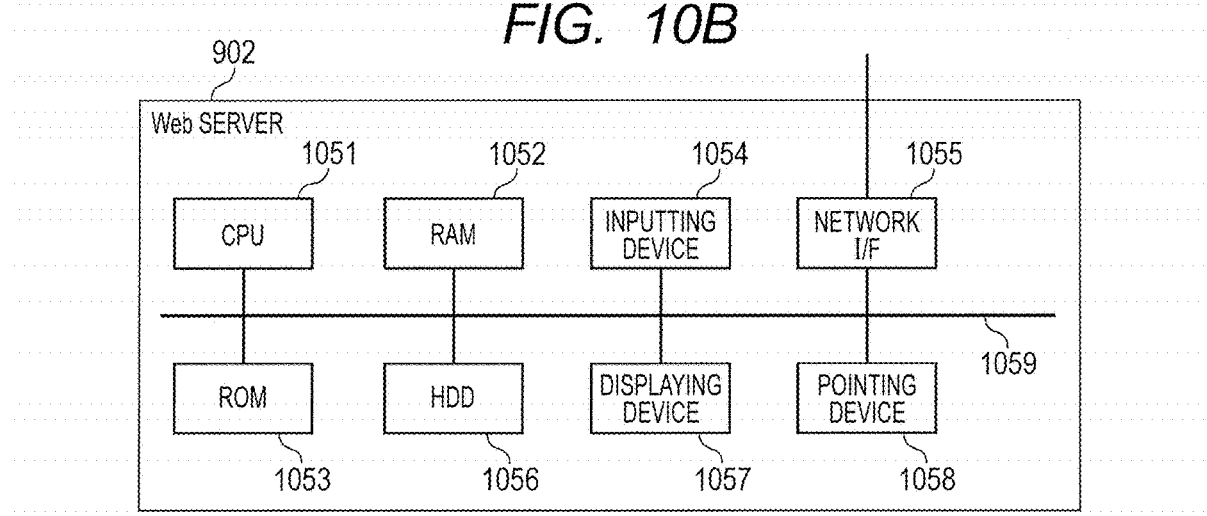

FIG. 10B is a block diagram exemplarily illustrating the hardware constitution of the Web server 902.

As illustrated in FIG. 10B, in the Web server 902, a CPU 1051, a RAM 1052, a ROM 1053, a network I/F (interface) 1055 and an HDD (hard disk drive) 1056 are mutually and communicably connected to others through a system bus 1059. Moreover, a displaying device 1057 such as an LCD (liquid crystal display) or the like, an inputting device 1054 such as a keyboard or the like, and a pointing device 1058 such as a mouse or the like are mutually and communicably connected to others through the system bus 1059.

The controlling programs such as the operating system and the like have been stored in the ROM 1053 or the HDD 1056. Incidentally, it is possible to use, instead of the HDD 1056, another storage device such as an SSD (solid state drive) or the like. The CPU 1051 functions as a computer by reading out the control program from the ROM 1053 or the HDD 1056 as necessary to the RAM 1052 and executing the read program. Moreover, the CPU 1051 displays various kinds of information though the displaying device 1057, and accepts user instructions and the like from the inputting device 1054 and the pointing device 1058. Moreover, the CPU 1051 communicates with another device by connecting to a network through the network I/F 1055.

<Example of Software Configuration of Mobile Terminal 901 in Present Embodiment>

Figure 11A:
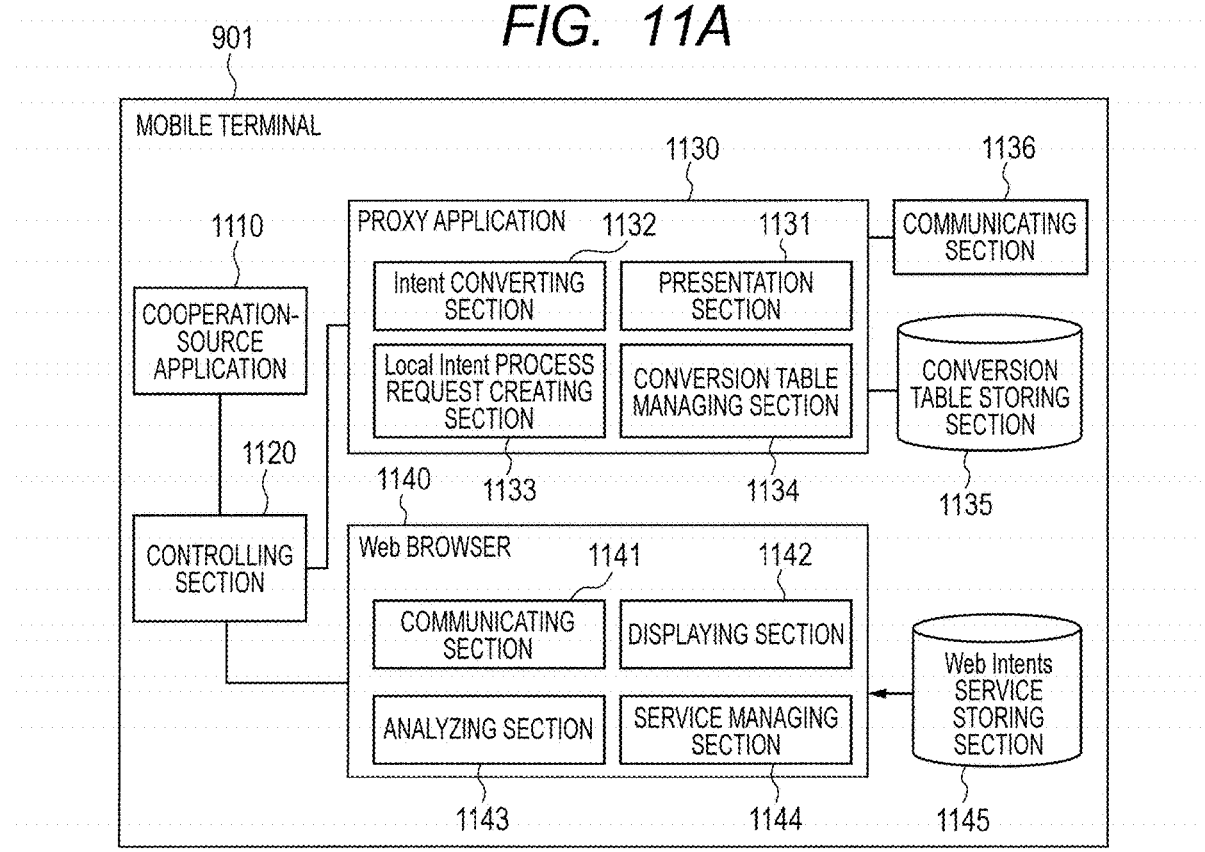
FIGS. 11A and 11B are diagrams exemplarily illustrating respective software configurations of the mobile terminal and the Web server.

FIG. 11A is a block diagram exemplarily illustrating the software (processing section) configuration of the mobile terminal 901.

In the mobile terminal 901, a cooperation-source application 1110, a controlling section 1120, a proxy application 1130, a Web browser 1140, and each processing section exist as the files which have been stored in the ROM 1003 of the mobile terminal 901. These applications and sections are program modules which are loaded to the RAM 1004 and executed by the controlling section 1120 and another processing unit (i.e., the CPU 1002) to cause the mobile terminal 901 to realize various functions when the mobile terminal 901 is started and/or each processing section executes the process.

The cooperation-source application 1110 can cooperate with another application by creating the Local Intent process request. Therefore, the cooperation-source application 1110 corresponds to the cooperation-source application 501 in FIG. 5.

The controlling section 1120 acts to pass the Local Intent process request to another application such as the proxy application 1130 or the like. Moreover, the controlling section 1120 acts to pass the result from another application to the cooperation-source application 1110. Therefore, the controlling section 1120 corresponds to the controlling section 502 in FIG. 5.

The proxy application 1130 accepts the Local Intent process request, and thus performs the process. Therefore, the proxy application 1130 corresponds to the cooperation-destination application 503 in FIG. 5. Incidentally, the proxy application 1130 is installed as the program for performing the process in response to the HTTP request. Moreover, the proxy application 1130 can cooperate with another application by creating the Web Intent process request. Therefore, the proxy application 1130 also corresponds to the client 101 in FIG. 1.

The proxy application 1130 includes a presentation section 1131, an Intent converting section 1132, a Local Intent process request creating section 1133 and a conversion table managing section 1134.

The presentation section 1131 is a software module which creates the HTML document in response to a page obtaining request or the like received through a later-described communicating section 1136. The Intent converting section 1132 is a software module which analyzes the Local Intent process request, and converts the Local Intent process request into the Web Intent process request. Moreover, the Intent converting section 1132 converts the Web Intent process result into the Local Intent process result.

The Local Intent process request creating section 1133 (hereinafter, called the process request creating section 1133) is a software module which creates the Local Intent process request. For example, the process request creating section 1133 creates the Local Intent process request for starting a Web browser program (for the Web browser 1140) so at to access a specific URL. The conversion table managing section 1134 is a software module which obtains the information which is necessary to convert the Local Intent process request into the Web Intent process request, from a later-described conversion table storing section 1135.

The conversion table storing section 1135 stores and manages the information which is necessary to convert the Local Intent process request into the Web Intent process request. More specifically, an action conversion table 1200 as illustrated in FIG. 12A is stored and managed. In the present embodiment, the conversion table storing section 1135 stores the action conversion table 1200. However, it is also possible to store and manage other information for converting the Local Intent process request into the Web Intent process request.

The communicating section 1136, which has a Web server function, is a software module which receives an HTTP request message from an external device and notifies the content of the request to the presentation section 1131 of the proxy application 1130. Moreover, the communication section 1136 transmits an HTTP response message to an external device in response to a request from the presentation section 1131.

The Web browser 1140 acts to pass the process request from the application such as the proxy application 1130 acting as the client 101 to other Web application acting as the service 103. Moreover, the Web browser 1140 acts to pass the process result from other Web application acting as the service 103 to the application acting as the client 101. Therefore, the Web browser 1140 corresponds to the UA 102 in FIG. 1.

The Web browser 1140 includes a communicating section 1141, a displaying section 1142, an analyzing section 1143 and a service managing section 1144. The communicating section 1141 accepts a request from another processing section, and thus transmits an HTTP request message to an external device. Moreover, the communicating section 1141 is a software module which receives an HTTP response message from an external device, and notifies the later-described analyzing section 1143 of the content of the response.

The displaying section 1142 is a software module which performs rendering of the HTML document. Moreover, the displaying section 1142 displays the screen for accepting a selection of the providing function of the Web Intents service in response to a request of another processing section. The analyzing section 1143 is a software module which analyzes the HTML document. Moreover, the analyzing section 1143 also analyzes the ECMAScript which is the Web Intent process request.

The service managing section 1144 is a software module which obtains/stores the information for specifying the registered Web Intents service from/in a later-described Web Intents service storing section 1145. The Web Intents service storing section 1145 (hereinafter, called the service storing section 1145) stores and manages data. More specifically, the service storing section stores/obtains the data in response to a request from the service managing section 1144. The service storing section 1145 stores and manages a registered Web Intents service table 1230 as illustrated in FIG. 12B.

<Example of Software Configuration of Web Server 902 in Present Embodiment>

Figure 11B:
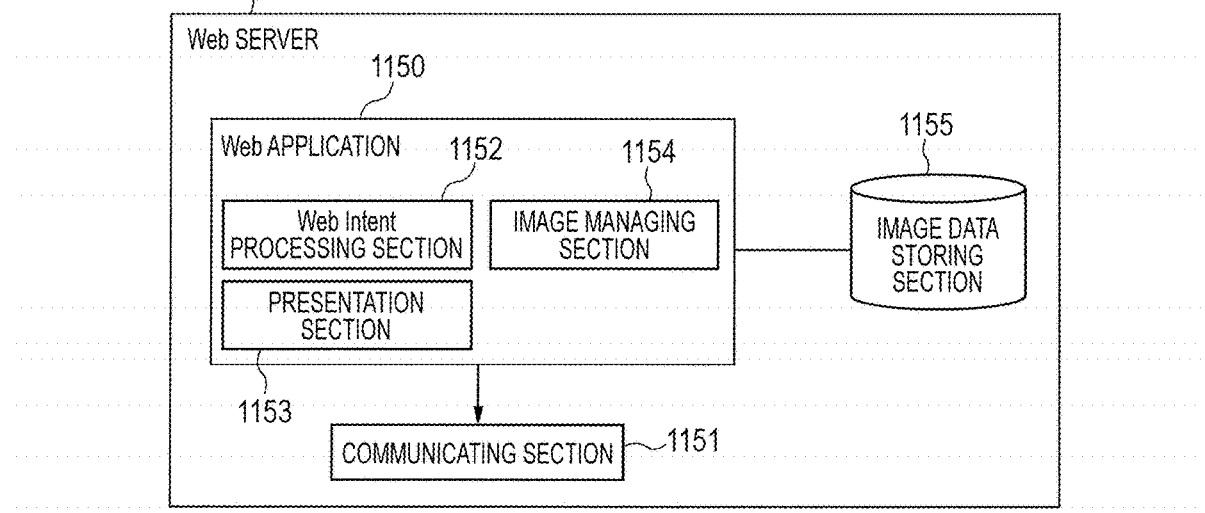

FIG. 11B is a block diagram illustrating an example of the software (processing section) configuration of the Web server 902.

In the Web server 902, a Web application 1150 and each processing section exist as the files which have been stored in the ROM 1053 or the HDD 1056 of the Web server 902. These applications and sections are program modules which are loaded to the RAM 1052 and executed by the OS and another processing unit (i.e., the CPU 1051) utilizing each processing section when the programs themselves are executed.

For example, the Web application 1150 is an application which provides a general photo service (PhotoService) for storing and sharing image data such as photographs and the like. Moreover, the Web application 1150 has a Web Intents service function for providing services by using the Web Intents technique. Therefore, the Web application 1150 corresponds to the service 103 in FIG. 1. Incidentally, the Web application 1150 is installed as the program for performing the process in response to the HTTP request.

The Web application 1150 includes a Web Intent processing section 1152, a presentation section 1153 and an image managing section 1154. The Web Intent processing section 1152 is a software module which analyzes and processes the Web Intent object, the presentation section 1153 is a software module which creates the HTML document in response to a page obtaining request or the like received through a later-described communicating section 1151, and the image managing section 1154 is a software module which obtains/stores image data from/to an image data storing section 1155 in response to a request from another processing section.

The image data storing section 1155, which stores and manages data, performs data storing and drawing in response to the request from the image managing section 1154. The communicating section 1151 is a software module which receives an HTTP request message from an external device and notifies the presentation section 1153 of the content of the received request. Moreover, the communicating section 1151, which has the Web server function, transmits an HTTP response message to an external device in response to a request from the presentation section 1153. In the image data storing section 1155, an image data management table 1250 as illustrated in FIG. 12C is stored and managed. Incidentally, it is possible to provide the image data storing section 1155 on a device other than the Web server 902.

<Tables to be Managed by Respective Storing Sections in Present Embodiment>

FIG. 12A is the diagram illustrating an example of the table configuration to be managed by the conversion table storing section 1135 of the mobile terminal 901. Incidentally, the table configuration illustrated in FIG. 12A is merely the example, and it is thus possible to use a different table configuration.

The information to be managed by the action conversion table 1200 includes "Action ID", "Local Intents action" and "Web Intents action". Here, "Action ID" indicates the ID for uniquely identifying the action of the Local Intent, "Local Intents action" indicates the action of the Local Intent process request, and "Web Intents action" indicates the action of the Web Intents.

Hereinafter, the record that "Action ID" on the action conversion table 1200 is "1" will be described by way of example. This record indicates that, when the Local Intents action is "ACTION_SEND", it is necessary in the Web Intent process request to convert the action into "http://WebIntents.org/share". Incidentally, although many actions of the Local Intents can be converted in this example, it only has to convert solely "action" of the function that the user intends to call by using the present invention. For example, it is possible to provide the configuration of being able to convert only "action" declared by the manifest file in FIG. 7.

FIG. 12B is the diagram illustrating an example of the table configuration to be managed by the service storing section 1145 of the mobile terminal 901. Incidentally, the table configuration illustrated in FIG. 12B is merely the example, and it is thus possible to use a different table configuration.

The registered Web Intents service table 1230 (hereinafter, called the registered service table 1230) manages the providing functions of the Web Intents service that the Web browser 1140 can mediate. The information to be managed by the registered service table 1230 includes "Service ID", "action", "type", "href", "disposition" and "base URI".

Here, "Service ID" indicates the ID for uniquely identifying the providing function of the Web Intents service in the Web browser 1140. Further, "action", which indicates the category of the providing function, is the information which indicates what kind of function and service should be provided. Furthermore, "type" indicates the type (kind) of data or the like that the providing function can handle, "href" indicates the relative URL of the providing function, "disposition" indicates how the called providing function is displayed, and "base URI" indicates the URL which is used as the base of the providing function.

For example, the record that "Service ID" on the registered service table 1230 is "1" will be described by way of example. In this record, it can be understood that the Web browser 1240 can mediate the Web Intent process request to "http://aaa.com/aaa_share.html".

FIG. 12C is the diagram illustrating an example of the table configuration to be managed by the image data storing section 1155 of the Web server 902. Incidentally, the table configuration illustrated in FIG. 12C is merely the example, and it is thus possible to use a different table configuration.

The image data management table 1250 is the table for managing the image data to be handled by the Web application 1150. The information to be managed by the image data management table 1250 includes "Image ID" and "File". Here, "Image ID" indicates the ID for uniquely identifying the image data in the Web application 1150, and "File" indicates the file name of the image data. That is, in the example of the image data management table 1250, the files of the two image data "image125.jpg" and "image435.jpg" are managed.

<Installation of Proxy Application 1130 in Present Embodiment>

Hereinafter, an operation of installing the proxy application 1130 in the mobile terminal 901 will be described with reference to a sequence diagram illustrated in FIG. 13.

Namely, FIG. 13 is the sequence diagram exemplarily illustrating the operation of installing the proxy application 1130 in the mobile terminal 901.

Initially, if a user operation or the like is accepted, the operation of installing the proxy application 1130 in the mobile terminal 901 is started. In S1301, the proxy application 1130 requests the controlling section 1120 to register the information of the functions provided by the proxy application itself. In S1302, the controlling section 1120 performs a process of registering the information of the functions provided by the proxy application 1130, and notifies the proxy application 1130 of the result of the registration.

Incidentally, it is assumed that the manifest file of the proxy application 1130 is equivalent to, e.g., the manifest file 700 described in FIG. 7. That is, this manifest file has the function that the name of the activity is "SendActivity", can accept the Local Intent process request for transmitting data (intent.action.SEND), and can handle image data of every format (*).

In S1303, the process request creating section 1133 of the proxy application 1130 creates the Local Intent process request for starting the Web browser 1140, and requests the process to the controlling section 1120. At this time, the page which is opened by the proxy application 1130 and used to register the Web Intents service is designated as the URL that the Web browser 1140 accesses. The designated URL is the localhost.

In S1304, the controlling section 1120 starts the Web browser 1140 to access the URL designated in S1303. In S1305, the started Web browser 1140 transmits an HTML obtaining request as an HTTP request to the designated URL. That is, in S1305, the Web browser 1140 accesses the page which is opened by the proxy application 1130 and designated in S1303. At this time, the HTTP request from the Web browser 1140 is transferred to the proxy application 1130 through the communicating section 1136.

In S1306, the proxy application 1130 creates a Web Intents service registration markup. Incidentally, the Web Intents service registration markup to be created here is used when the Web application 1150 registers the providing function of the Web Intents service. In S1307, the proxy application 1130 transmits the HTML document which includes the Web Intents service registration markup created in S1306, to the Web browser 1140 as an HTTP response.

If the HTML document in S1307 is received, in S1308, the Web browser 1140 analyzes the Web Intents service registration markup included in the received HTML document, and registers the providing function of the Web Intents service as the UA 102 therein. More specifically, the analyzing section 1143 of the Web browser 1140 analyzes the Web Intents service registration markup, and specifies the Web Intents service. Then, the service managing section 1144 of the Web browser 1140 registers the necessary information to the registered service table 1230 of the service storing section 1145.

The proxy application 1130 is installed as described above. Incidentally, it should be noted that the above processes in S1303 to S1308 are not indispensable in the present invention. However, if the providing function of the Web Intents service is registered in the Web browser 1140 when the proxy application is installed, it is possible to prevent a phenomenon that, when cooperation is performed, any one of the cooperation-destination Web Intents services is not registered in the Web browser. Moreover, it is possible to register, in the Web browser 1140, the Web Intents service that the vendor who developed the proxy application 1130 recommends.

<Cooperation of Applications in Present Embodiment>

Hereinafter, an operation in which the cooperation-source application 1110 and the Web application 1150 cooperate with each other will be described with reference to FIGS. 14 to 17.

FIG. 14 is the sequence diagram exemplarily illustrating a series of operations in which the cooperation-source application 1110 and the Web application 1150 cooperate with each other.

Figure 15A:
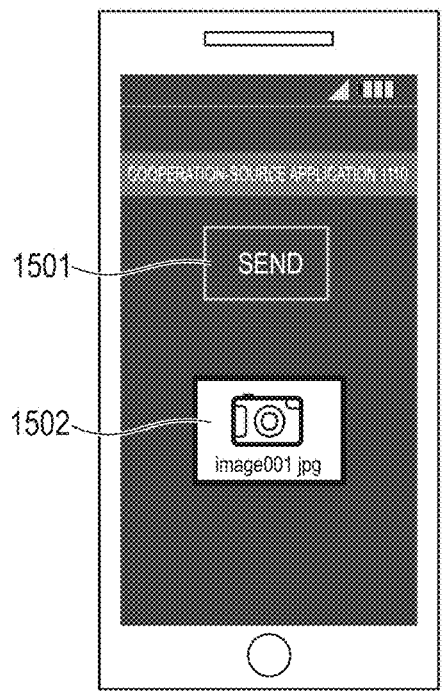
FIGS. 15A, 15B, 15C and 15D are diagrams exemplarily illustrating UIs of the mobile terminal respectively.

Initially, in response to a user operation, the cooperation-source application 1110 displays a UI illustrated in FIG. 15A.

Each of FIGS. 15A to 15D is the diagram exemplarily illustrating a UI screen which is displayed on the display 1014 of the mobile terminal 901 when the cooperation-source application 1110 and the Web application 1150 cooperate with each other. FIG. 15A shows the UI for transmitting an "image001.jpg" 1502 from the cooperation-source application 1110 to another application. On the UI of FIG. 15A, if a depression of a "SEND" button 1501 by a user is accepted, the cooperation-source application 1110 performs the process in S1401 of FIG. 14.

In S1401, the cooperation-source application 1110 creates a Local Intent process request and transfers the created Local Intent process request to the controlling section 1120. Incidentally, it is assumed that the source codes by which the cooperation-source application 1110 creates the Local Intent process request is equivalent to, e.g., the source code 800 illustrated in FIG. 8. That is, "ACTION_SEND" can be handled as the action, and the cooperation with the application capable of processing the format of any image data is requested. Incidentally, the process in S1401 corresponds to the process in S602 of FIG. 6.

If the Local Intent process request in S1401 is received, the controlling section 1120 analyzes the received Local Intent process request. Then, the controlling section 1120 extracts, from the application providing functions registered therein, the application providing function of which the type coincides with that of the designated action of the Local Intent, and list-displays the names of the extracted providing functions as illustrated in FIG. 15B to request the user to perform selection.

Figure 15B:
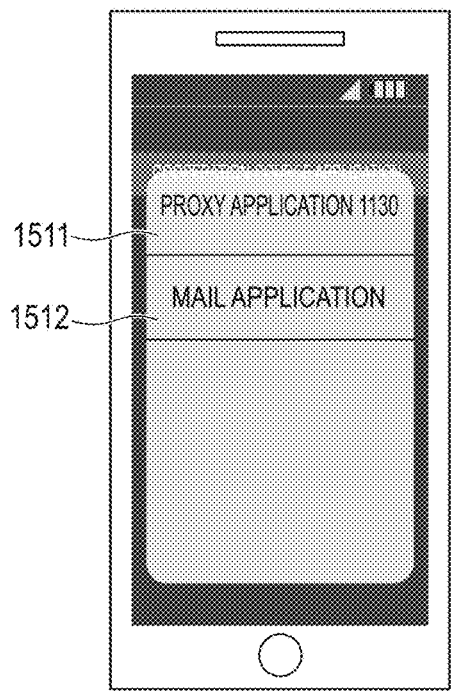

On the UI of FIG. 15B, the proxy application 1130 and the mail application are displayed respectively as options 1511 and 1512. It can be understood that these applications can process the Local Intent process request received in S1401. If it is accepted that the proxy application 1130 (i.e., the option 1511) was selected by the user from the list of the UI of FIG. 15B, the controlling section 1120 performs the process in S1402.

In S1402, the controlling section 1120 transfers the Local Intent process request transferred from the cooperation-source application 1110 in S1401 to the proxy application 1130 serving as the cooperation-destination application (thereby requesting to execute "ACTION_SEND"). Incidentally, this process corresponds to the process in S604 of FIG. 6.

If the Local Intent process request is received in S1402, the proxy application 1130 performs the process in S1403. In S1403, the process request creating section 1133 of the proxy application 1130 creates the Local Intent process request, and transfers the created request to the controlling section 1120.

Incidentally, the Local Intent process request created in S1403 is the Local Intent process request for starting the Web browser 1140 to access the page (i.e., the Web site) which is opened by the proxy application 1130. The page which is opened by the proxy application 1130 and designated here is the page (i.e., the Web site) for calling, as the client 101, the providing function of the Web Intents service.

In S1404, the controlling section 1120 starts the Web browser 1140 so as to access the URL designated in S1403. In S1405, the Web browser 1140 transmits an HTML document obtaining request as an HTTP request to the URL designated in S1404. That is, the Web browser 1140 accesses the page which is opened by the proxy application 1130 and designated in S1403. At this time, more specifically, the HTTP request transferred from the Web browser 1140 is transferred to the proxy application 1130 through the communicating section 1136.

In S1406, the proxy application 1130 creates the Web Intent process request from the Local Intent process request received in S1402. Here, the process to be performed by the proxy application 1130 in S1406 will be described with reference to FIG. 16.

FIG. 16 is the flow chart for exemplarily describing the process to be performed by the proxy application 1130 in S1406. Incidentally, it is assumed that the respective steps in this flow chart are achieved on condition that the CPU 1002 of the mobile terminal 901 reads out and executes the control programs which have been stored in the non-volatile storage device such as the ROM 1003 or the like and are particular to the present invention.

In S1601, the presentation section 1131 monitors and checks whether or not the HTTP request (S1405 in FIG. 14) is received. If it is decided that the HTTP request is not received (NO in S1601), the presentation section 1131 continues the monitoring in S1601. On the other hand, if it is decided by the presentation section 1131 that the HTTP request is received (YES in S1601), the Intent converting section 1132 performs the process in S1602.

In S1602, the Intent converting section 1132 reads the Local Intent process request received in S1402 of FIG. 14, and the process is advanced to S1603. In S1603, the Intent converting section 1132 converts the action of the Local Intent process request into the action of the Web Intents, and the process is advanced to S1604.

More specifically, the Intent converting section 1132 transfers, to the conversion table managing section 1134, the action of the Local Intent process request received in S1402. The conversion table managing section 1134 obtains the action of the Web Intents which is associated with the action of the Local Intent process request received in S1402 from the action conversion table 1200 managed in the conversion table storing section 1135. Moreover, the conversion table managing section 1134 transfers the obtained action of the Web Intents to the Intent converting section 1132. For example, when the action of the Local Intent process request received in S1402 is "ACTION_SEND", the action is converted into "http://Web Intents.org/share".

In S1604, the Intent converting section 1132 converts the type of the Local Intent process request received in S1402 into the type of the Web Intents, and the process is advanced to S1605. In the present embodiment, the types of both the Local Intents and the Web Intents are described in the form of Content-Type of MIME (Multipurpose Internet Mail Extensions). Therefore, the contents described in the type of the Local Intent process request are directly used for the Web Intent process request.

For example, since the type of the Local Intent process request illustrated in FIG. 4 is "image/*", "image/*" is used also as the Web Intent process request. Incidentally, if the type is described in another form, as well as the case of the action, it is possible to provide a table for converting the type in the conversion table storing section 1135. As just described, the Intent converting section 1132 converts a part of the designation content included in the Local Intent process request into the forms of classification information (i.e., the information described in the action) included in the function information corresponding to the registering process by the relay function of the UA and information (i.e., the information described in the type) of the data type.

In S1605, the Intent converting section 1132 creates the Web Intent process request by using the action and the type respectively converted in S1603 and S1604, and the whole processes in the flow chart are ended. Incidentally, it is assumed here that the content of the Local Intent process request received in S1402 is equivalent to that of the Local Intent process request illustrated in FIG. 8, and the content of the Web Intent process request created in S1406 is equivalent to that illustrated in FIG. 4. As just described, the Web Intent process request is created from the Local Intent process request.

Here, the described is returned to FIG. 14.

In S1407, the presentation section 1131 serving as the client 101 transmits the HTML document which includes the Web Intent process request created in S1406 to the Web browser 1140 serving as the UA 102 as an HTTP response through the communicating section 1136. Incidentally, this process corresponds to the process in S204 of FIG. 2.

In S1408, the Web browser 1140 serving as the UA 102 displays the HTML document received in S1407. More specifically, the analyzing section 1143 of the Web browser 1140 analyzes the HTML document, and the displaying section 1142 displays the HTML document.

Figure 15C:
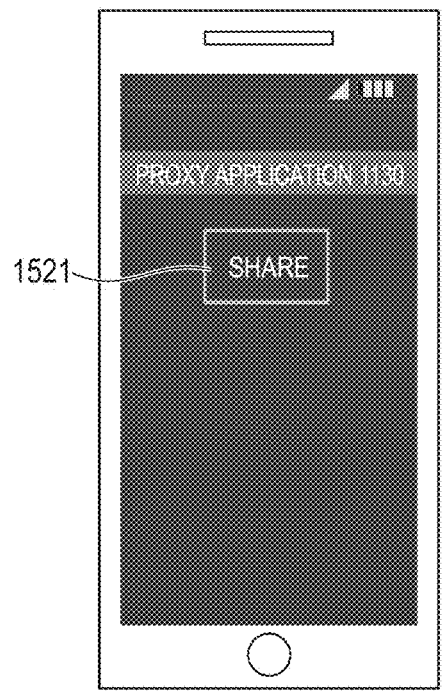

Here, the UI of FIG. 15C is the UI which is displayed by the Web browser 1140 as the UA 102 in S1408. In the UI of FIG. 15C, a "SHARE" button 1521 has the ID "share-photo". If this button is depressed, the unnamed function included in the Web Intent process request illustrated in FIG. 4 is executed. That is, if the depression of the "SHARE" button 1521 by the user operation is accepted, the Web browser 1140 serving as the UA 102 performs the process in S1409. Incidentally, this process corresponds to the process in S205 of FIG. 2.

In S1409, the Web browser 1140 serving as the UA 102 executes the unnamed function indicated in FIG. 4, and displays the list of the providing functions of the Web Intents service registered in the Web browser 1140 serving as the UA 102. More specifically, the service managing section 1144 obtains the information from the registered service table 1230 of the service storing section 1145. Here, the information to be obtained is the information for specifying the providing function of the Web Intents service which coincides with the action and the type designated by the Web Intent process request. For example, if the Web Intent process request is equivalent to that illustrated in FIG. 4, the action is "share" and the type is "image/*". For this reason, the service managing section 1144 obtains the information of the record that "Service ID" on the registered service table 1230 is "1" and "3".

Figure 15D:
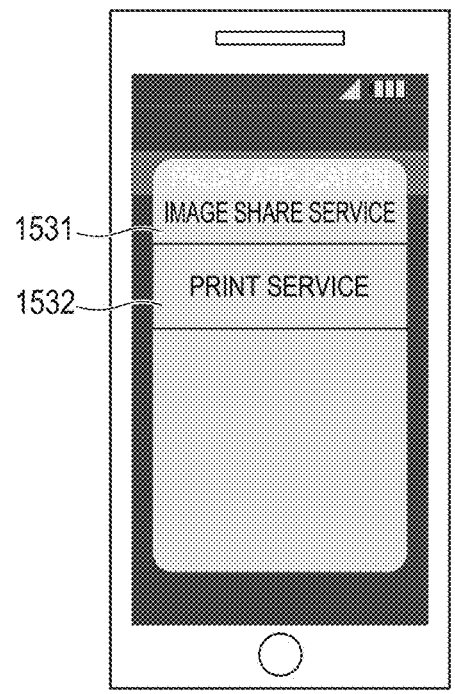

FIG. 15D illustrates the example of the UI on which the Web browser 1140 displays the list of the providing functions of the service in S1409. On the UI of FIG. 15D, buttons (i.e., buttons 1531 and 1532 as options) for calling the providing functions of the Web Intents service that "Service ID" on the registered service table 1230 is "1" and "3" are displayed. If the "IMAGE SHARE SERVICE" button 1531 is depressed on the UI of FIG. 15D, the Web browser 1140 serving as the UA 102 performs the process in S1410.

Incidentally, in this example, the Web Intent process request created in S1406 is illustrated in FIG. 4. Besides, as another example, a case where the Web Intent process request created in S1406 is illustrated in FIG. 17 will be described.

FIG. 17 is the diagram exemplarily illustrating the HTML document which includes the Web Intent process request created in S1406. The Web Intent process request in FIG. 17 is described so as not to execute the unnamed function when the button is depressed but to execute the unnamed function when the relevant HTML page is loaded. For this reason, the unnamed function is executed without a display of the UI as in FIG. 15C described in S1408, and the UI of FIG. 15D displayed in S1409 is displayed. Thus, it is possible to save the trouble of user operation for the depression of the "SHARE" button which is necessary for the UI of FIG. 15C.

Here, the described is returned to FIG. 14.

In S1410, the Web browser 1140 serving as the UA 102 transmits the Web Intent process request received in S1407 as an HTTP request to the Web application 1150 of the Web server 902 serving as the service 103. At this time, the Web Intent object which is created by the unnamed function of FIG. 4 (or FIG. 17) executed in S1409 is included in the data to be transmitted. Incidentally, this process corresponds to the process in S207 of FIG. 2.

If the HTTP request in S1410 is received, the Web application 1150 performs the process in S1411. In S1411, the Web application 1150 serving as the service 103 draws the Web Intent object from the Web Intent process request received in S1410, and stores the image data included in the Web Intent object as the process of the providing function. In more detail, the Web Intent processing section 1152 of the Web application 1150 analyzes the received Web Intent process request, obtains the image data included in the Web Intent object, and transfers the obtained image data to the image managing section 1154. Then, the image managing section 1154 registers the transferred image data to the image data management table 1250 of the image data storing section 1155. That is, in this example, the image data of "image001.jpg" 1502 displayed by the cooperation-source application 1110 in FIG. 15A is registered to the image data storing section 1155 of the Web server 902 serving as the service 103. Incidentally, the process in S1411 corresponds to the process in S208 of FIG. 2.

After the end of the Web Intent process as the service 103, the Web application 1150 of the Web server 902 performs the process in S1412.

In S1412, the Web application 1150 of the Web server 902 returns the Web Intent process result as the service 103. More specifically, the Web application returns the response, which includes the ECMAScript to be notified to the proxy application 1130 serving as the client 101, to the Web browser 1140 serving as the UA 102. Incidentally, this process corresponds to the process in S209 of FIG. 2.

If the response in S1412 is received, the Web browser 1140 serving as the UA 102 performs the process in S1413. In S1413, as the UA 102, the Web browser 1140 executes the ECMAScript included in the response in S1412, and calls the callback function onSuccess( ) designated by the argument of the startActivity( ) function. Incidentally, this process corresponds to the process in S210 of FIG. 2.

In S1414, as the UA 102, the Web browser 1140 returns, by the callback function onSuccess( ) called in S1413, the process result to the proxy application 1130 serving as the client 101. Incidentally, this process corresponds to the process in S211 of FIG. 2.

If the process result in S1414 is received, the proxy application 1130 performs, as the UA 102, the process in S1415. In S1415, the Intent converting section 1132 of the proxy application 1130 creates, as the cooperation-destination application 503, the Local Intent process result according to the Web Intent process result received in S1414. Here, it is assumed that the process result received in S1414 indicates success and the identifier indicating the success is included in the Local Intent process result. Incidentally, it is assumed that, if the process result received in S1414 indicates failure, the identifier indicating the failure is included in the Local Intent process result.

In S1416, the proxy application 1130 notifies, as the cooperation-destination application, the Local Intent process result created in S1415 to the controlling section 1120. Incidentally, this process corresponds to the process in S606 of FIG. 6.

If the notification in S1416 is received, the controlling section 1120 performs the process in S1417. In S1417, the controlling section 1120 calls the callback function onActivityResult( ) indicated by the source code 800 of FIG. 8, and notifies the Local Intent process result in S1416 to the cooperation-source application 1110. Incidentally, this process corresponds to the process in S607 of FIG. 6.

As described above, in the present embodiment, the proxy application 1130 converts the process request (process performing request) of the application in the mobile terminal (information processing terminal) 901 into the process request (process performing request) that the Web application can analyze for the mediation. Thus, it is possible, from the mechanism (e.g., the Local Intents such as the Intents of the Android™ OS) of cooperating the applications running in the information processing terminal not corresponding to the Web Intents, to use the Web service cooperation such as the Web Intents or the like on the network. Therefore, it is possible to easily establish the cooperation between the application in the information processing terminal such as the mobile terminal or the like and the service on the network (i.e., the Web application on the Internet).

Incidentally, the various data structures and the contents thereof are not limited to those described above. That is, it is needless to say that various data structures and contents can be applied according intended purposes.

Although the present invention has been described with reference to the one embodiment as described above, the present invention can be carried out as various embodiments such as a system, an apparatus, a method, a computer program, a computer-program storing medium and the like. Specifically, the present invention can be applied not only to a system composed of a plurality of devices but also to an apparatus composed of a single device.

Moreover, it should be noted that also the constitution or configuration which is obtained by combining the above embodiments is wholly included in the present invention.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-009386, filed Jan. 22, 2014, which is hereby incorporated by reference wherein in its entirety.

The invention claimed is:

1. An information processing terminal which has a web browser by which a client which manages data and a service which provides a function by using the data managed by the client cooperate with each other through a network, the information processing terminal comprising:
   a memory storing instructions related to a proxy application; and
   a processor constructed to execute the instructions stored in the memory so as to cause the information processing terminal to:
   request to start the web browser, in which function information for calling a function provided by a service on the network has been registered, in response to a call specifying a type of function from an application as the client in the information processing terminal to a proxy application;
   receive an access for a site provided by the proxy application from the started web browser;
   create page data for calling the function information corresponding to the specified type of function according to the access; and
   transmit the created page data to the web browser as a response to the access,
   wherein, responsive to execution of a request using the function information via a page based on the created page data by the web browser, the data managed by the application as the client is processed by using the function provided by the service corresponding to the function information.

2. The information processing terminal according to claim 1, wherein the network includes the Internet.

3. The information processing terminal according to claim 1, wherein, in the function information, any one of classification information corresponding to a function to share data, classification information corresponding to a function to edit data, classification information corresponding to a function to browse data, classification information corresponding to a function to obtain data, and classification information corresponding to a function to store data is described as classification information.

4. The information processing terminal according to claim 1, wherein the instructions further cause the information processing terminal to perform a notification for the application as the client according to a process result in the service corresponding to the function information from the web browser.

5. A controlling method in an information processing terminal which has a web browser by which a client which manages data and a service which provides a function by using the data managed by the client cooperate with each other through a network, the method comprising:
   requesting to start the web browser, in which function information for calling a function provided by a service on the network has been registered, in response to a call specifying a type of function from an application as the client in the information processing terminal to a proxy application;
   receiving an access for a site provided by the proxy application from the started web browser;
   creating page data for calling the function information corresponding to the specified type of function according to the access; and
   transmitting the created page data to the web browser as a response to the access,
   wherein, responsive to execution of a request using the function information via a page based on the created page data by the web browser, the data managed by the application as the client is processed by using the function provided by the service corresponding to the function information.

6. The controlling method according to claim 5, wherein the network includes the Internet.

7. The controlling method according to claim 5, wherein the instructions further cause the information processing terminal to perform a notification for the application as the client according to a process result in the service corresponding to the function information from the web browser.

8. A non-transitory computer-readable storage medium which stores a program for causing a computer to perform a controlling method in an information processing terminal which has a web browser by which a client which manages data and a service which provides a function by using the data managed by the client cooperate with each other through a network, the controlling method comprising:
   requesting to start the web browser, in which function information for calling a function provided by a service on the network has been registered, in response to a call specifying a type of function from an application as the client in the information processing terminal to a proxy application;

receiving an access for a site provided by the proxy application from the started web browser;
creating page data for calling the function information corresponding to the specified type of function according to the access; and
transmitting the created page data to the web browser as a response to the access,
wherein, responsive to execution of a request using the function information via a page based on the created page data by the web browser, the data managed by the application as the client is processed by using the function provided by the service corresponding to the function information.

* * * * *